Sept. 9, 1941.  C. MENEUX ET AL  2,255,226
FLOUR MILL WITH GARLIC SEPARATOR
Filed April 8, 1939

Charles Meneux
Sylvain Gabriel Bourdin
Louis Chaussé
INVENTORS their ATT'Y.

Patented Sept. 9, 1941

2,255,226

UNITED STATES PATENT OFFICE 2,255,226

FLOUR MILL WITH GARLIC SEPARATOR

Charles Meneux, Nantes, Sylvain Gabriel Bourdin, Angers, and Louis Chaussé, Nantes, France Application April 8, 1939, Serial No. 266,754
In France April 16, 1938

3 Claims. (Cl. 83—93)

Several apparatus have already been proposed for separating garlic from cereal grains before said grains are milled into flour. Such apparatus generally comprise a metallic roller associated with a rubber roller and tangentially bearing against it. The operation of such apparatus is far from being satisfactory because when non-decorticated garlic passes between the two rollers it is only temporarily flattened and soon resumes its previous form when leaving the rollers due to the elasticity of its husk while when causing husked garlic to pass between the said rollers, a substantial proportion of garlic sticks to the metallic roller and therefore remains in the cereal grains.

The present invention has for its primary object to provide an improved method and means whereby cereal grains such as wheat or rye grains can be efficaciously freed of substantially the whole of their garlic content by simple and reliable means during the course of the milling operations that is to say between the first and last grinding stages.

Another object of the invention is to provide means readily incorporatable to a grain milling plant for automatically eliminating garlic or other impurities from a mass of cereal grains that has already been partly ground to the state of a coarse meal and before its final conversion into flour.

Still another object of the invention is to provide means whereby garlic or other impurities present in the meal are automatically picked out and led away to be separately collected while the meal being now freed of garlic continues its cyclic path to one or more other grinding stages.

A further object of the invention is to provide an apparatus adaptable to a corn milling plant and comprising a combination of means constructed and corelated in such a way that the meal constituents left in the separated garlic such as meal particles or bran can be recovered and led back to the milling cycle of the bulk of the meal now devoid of garlic.

A further object of the invention is to provide an apparatus for the purpose specified made up of a comparatively small number of rugged, durable and easily replaceable parts.

With these and such other objects and features in view as will incidentally appear hereafter, the invention comprises the novel combination of steps and the novel construction and arrangement of parts that will now be described with reference to the accompanying diagrammatic drawing exemplifying an embodiment of the same and forming a part of the present disclosure.

Figure 1:
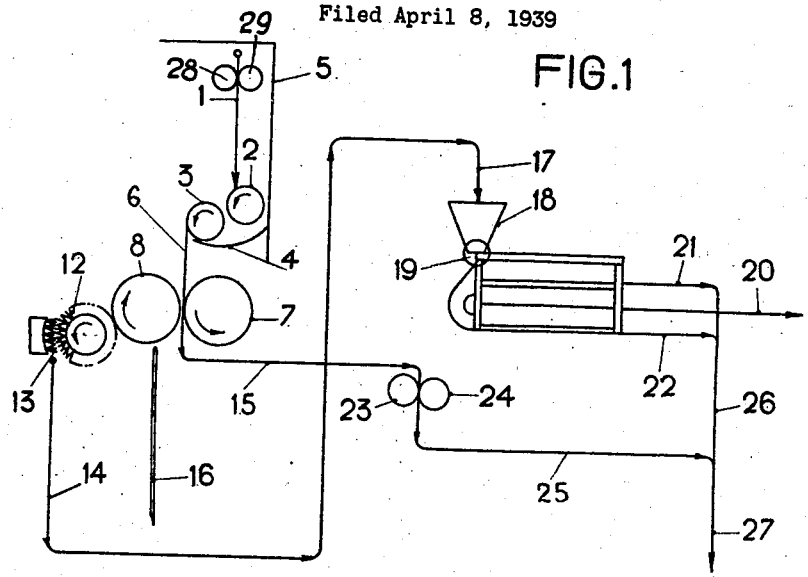
Figure 1 is a diagrammatic view showing several devices comprised in the apparatus for carrying out the process according to the invention.

As illustrated in Fig. 1, the mass of hulled or decorticated and partly ground cereal grains (for example wheat or corn grains) mixed with a certain proportion of garlic (which varies with the nature and origin of the crop) is fed in meal form from preliminary grinding means i. e. grinding rollers 28—29 in the direction depicted by the line 1 to a revoluble roll 2 which co-operates with a slightly spaced companion roll 3 rotating in the same direction to form a distributor mounted over a trough 4 adjacent the frame wall 5. The purpose of such distributor is to form the mass of grains mixed with garlic into a sheet and to feed such sheet by gravity (as shown by the line 6) between the rigid cylindrical rollers 7, 8 which rotate in opposite directions under the action of any suitable drive (not shown) preferably at slightly different angular speeds and are in substantially tangential relation.

Figure 2:
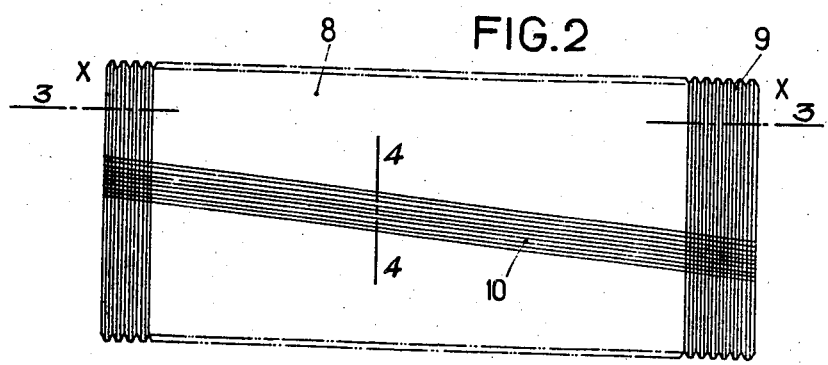
Figure 2 is an elevational view of one of a pair of co-operating garlic-removing cylindrical rollers showing, partly, the grooves and flutes on its peripheral surface.
Figure 3:
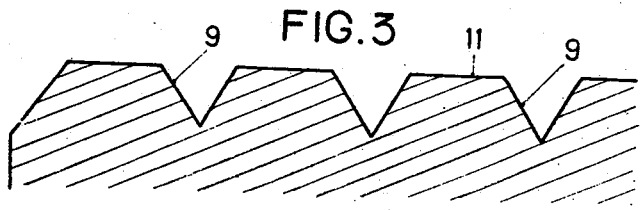
Figure 3 is a sectional view on a much larger scale showing a few of the spaced grooves on the roller taken on line 3—3 of Fig. 2.
Figure 4:
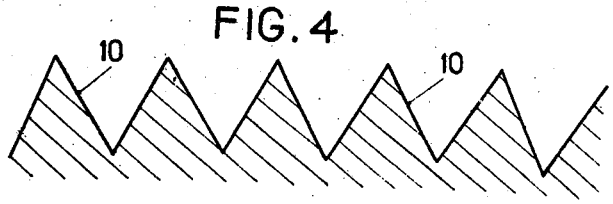
Figure 4 is a sectional view on the same scale as Fig. 3 showing a few of the contiguous flutes on the said roller, taken on line 4—4 of Fig. 2.

The purpose of the co-operating rollers 7, 8 is to remove or pick up the garlic seeds scattered amidst the meal of cereal grains from said meal. This result is obtained in the embodiment illustrated by providing the roller 8 with grooves 9 and flutes or flutings 10 shaped, arranged and extending as shown by Figs. 2, 3 and 4. The grooves 9 extend at right angles to the generatrix $x$—$x$ of the roller 8; they are separated by plain surfaces 11. The flutes 10 run slightly obliquely to the generatrix $x$—$x$ and are arranged in contiguous relationship. The grooves 9 and flutes 10 intersect one another to form angles having about 75° and 105°. Such angularities are not limitative.

The peripheral surface of the grooved and fluted roller 8 is rubbed by a revoluble brush 12 mounted on an axis extending parallel to the axis of the roller 8. The brush 12 is actuated by frictional contact with the roller 8 and its rotary motion is slackened by the braking effect exerted by a stationary brush 13 arranged sidewise, so that the peripheral speed of the brush 12 is considerably smaller than that of the roller 8. Assuming for instance the roller 8 to rotate at a speed of 350 R. P. M., the brush 12 may turn at a speed of 60 to 80 R. P. M. to properly exercise its action.

The brush 12 may have any suitable shape and size and it may be arranged to rub either the roller 8 or the roller 7. Its bristles are constituted advantageously by goose feathers and/or piassaba fibres. The purpose of the brush 12 is to strip off or eject the garlic seeds from the grooves 9 and flutes 10 by which they are picked up on the roller 8. Such result is obtained with more certainty owing to the fact that the preliminary decorticating action to which the grain mixture is subjected hulls the garlic seeds and uncovers their pulp which is a little tacky, whereby it can be seized more easily by the bristles of the brush 12.

The purpose of the stationary brush 13 is both to slacken the speed of the brush 12 and to strip its bristles.

The garlic seeds that are ejected from the roller 8 by the action of the brush 12 fall as shown by the line 14 while carrying with them a small proportion of bran and meal. Simultaneously, the cereal grains freed from the garlic seeds leave the co-operating rollers 7 and 8 and fall by gravity along the path depicted by the line 15. The paths 14 and 15 followed by the respective substances are separated by a baffle or partition 16 to prevent them from intermingling again.

The path 14 leads at 17 to the hopper 18 of a separating device 19 the purpose of which is to sort the garlic seeds from the bran and meal carried thereby. Such separating device may be of any known type and may comprise for example a plane sieve as used for separating groats from semolina or other meal components, and a fan adapted to remove the several portions of bran. The garlic seeds are discharged at 20 while the bran is collected at 21 and the meal is collected at 22.

The path 15 leads to a grinding device which may be made up of a pair of tangential cylinders 23, 24 capable of further grinding the meal to a finer flour. One or more pairs of such grinding cylinders may be provided to operate either in series or in parallel. The flour leaving the grinding device follows the path depicted by the line 25 and meets the substances which come from the separating device 19 as shown at 26. The mixed substances then reach at 27 the bolting stage (not shown) which may be performed in any known way.

As will be seen, the garlic seeds are removed from the cereal grains during the course of the milling operations that is to say intermediate several grinding stages, so that the present process and apparatus can be suitably incorporated to a milling plant.

It will be understood that the process and apparatus are applicable to all kinds of cereals and to all sorts of impurities similar to garlic.

What we claim is:

1. In a milling plant comprising means for hulling and grinding a mass of cereal grains mixed with garlic to produce a coarse meal, means for distributing said meal into sheet form, a pair of cooperating rigid surfaced rollers rotating in opposite directions at slightly different speeds and so located as to receive between them on one side the sheet of meal, one of said rollers having peripheral inter-crossed grooves, a revoluble brush in rubbing contact with the grooved roller, a stationary brush engaging said revoluble brush at a position remote from the point where it rubs the roller, the degree of engagement of both brushes being sufficient to cause the revoluble brush to rotate at an angular speed much slower than that of the grooved roller, and means for separately collecting the garlic ejected off said brushes and the meal free of garlic from the outlet side of said rollers.

2. In a milling plant comprising means for hulling and grinding a mass of cereal grains mixed with garlic to produce a coarse meal, means for distributing said meal into sheet form, a pair of cooperating rollers having rigid surfaces and rotating at slightly different speeds in opposite directions, said rollers receiving between them on their inlet side the sheet of meal, at least one of said rollers having peripheral grooves intercrossing one another angularly, the grooves extending in one direction being separated by flats while the grooves extending in the other direction are separated by sharp edges, movable friction means in contact with the grooved roller, stationary friction means rubbing said movable friction means at a point remote from its engagement with said roller, and means for separately collecting the garlic ejected off said friction elements and the meal free of garlic from the outlet side of said rollers.

3. In a milling plant comprising means for hulling and grinding a mass of cereal grains mixed with garlic to produce a coarse meal, means for distributing said meal in sheet form by gravity, a pair of cooperating cylindrical rollers having rigid surfaces and rotating in opposite directions, said rollers having their inlet crotch so located as to receive the sheet of meal, one of said rollers having peripheral grooves extending at right angles to its generatrix and separated by flats and other peripheral grooves extending at an angle to the first-named grooves and separated by sharp edges, movable friction means in permanent contact with the grooved roller, stationary friction means rubbing said movable friction means at a position remote from its point of engagement with said grooved roller, and means for separately collecting and leading away the garlic ejected off said friction elements and the meal free of garlic from the outlet side of said rollers.

CHARLES MENEUX.
SYLVAIN GABRIEL BOURDIN.
LOUIS CHAUSSÉ.